(12) United States Patent
Dean

(10) Patent No.: US 12,406,401 B2
(45) Date of Patent: Sep. 2, 2025

(54) SYSTEMS AND METHODS FOR GENERATING A LINE THAT REPRESENTS DIFFERENT FREQUENCIES BASED ON MULTI-DIMENSIONAL DATA ENCODING

(71) Applicant: Illuscio, Inc., Culver City, CA (US)

(72) Inventor: Kevin Edward Dean, Greenwood, IN (US)

(73) Assignee: Illuscio, Inc., Culver City, CA (US)

( * ) Notice: Subject to any disclaimer, the term of this patent is extended or adjusted under 35 U.S.C. 154(b) by 443 days.

(21) Appl. No.: 17/929,223

(22) Filed: Sep. 1, 2022

(65) Prior Publication Data
US 2024/0078711 A1    Mar. 7, 2024

(51) Int. Cl.
*G06T 9/00* (2006.01)
*G06F 16/174* (2019.01)

(52) U.S. Cl.
CPC .......... *G06T 9/001* (2013.01); *G06F 16/1744* (2019.01)

(58) Field of Classification Search
CPC . G06V 10/7715; G06K 19/06037; G06T 9/00
See application file for complete search history.

(56) References Cited

U.S. PATENT DOCUMENTS

| | | | | |
|---|---|---|---|---|
| 2003/0156652 A1* | 8/2003 | Wise | ........................ | G06F 13/16 711/E12.003 |
| 2003/0169940 A1* | 9/2003 | Short | ..................... | H04N 19/90 380/263 |
| 2008/0199091 A1* | 8/2008 | Srinivasan | ........... | H04N 19/176 382/239 |
| 2015/0066834 A1* | 3/2015 | Jeffries | .................... | H03M 7/70 707/752 |
| 2015/0287422 A1* | 10/2015 | Short | ........................ | G01S 3/74 704/211 |
| 2016/0210534 A1* | 7/2016 | Padubrin | .......... | G06V 30/19127 |
| 2016/0373771 A1* | 12/2016 | Hendry | .................. | H04N 19/30 |
| 2017/0060955 A1* | 3/2017 | Teerlink | ............ | G06F 16/24561 |
| 2019/0075306 A1* | 3/2019 | Hendry | .................. | H04N 19/46 |
| 2019/0171856 A1* | 6/2019 | Sharma | ............ | G06K 19/06103 |
| 2020/0288161 A1* | 9/2020 | Wang | ...................... | H04N 19/46 |
| 2021/0201538 A1* | 7/2021 | Xu | ......................... | G06T 3/4084 |
| 2021/0217202 A1* | 7/2021 | Zakharchenko | ..... | H04N 19/597 |
| 2021/0398324 A1* | 12/2021 | Zakharchenko | ........ | G06T 9/001 |

* cited by examiner

*Primary Examiner* — Guillermo M Rivera-Martinez
(74) *Attorney, Agent, or Firm* — Ansari Katiraei LLP; Arman Katiraei; Sadiq Ansari

(57) ABSTRACT

A multi-dimensional encoder ("MDE") receives a file with different data points. Each data point is defined with uncompressed multi-dimensional data. The multi-dimensional data may include multiple elements for defining a data point position (e.g., a multi-dimensional position including x, y, and/or z coordinates), color values of the data point (e.g., red, green, and blue), and/or other data point attributes. The MDE assigns an index to each data point or each data point element, and maps the data points to a frequency domain based on a frequency with which values occur in two or more of the elements (e.g., multiple dimensions). The MDE generates a line that represents the frequency, and provides a compressed file format to a requesting device that includes the line and different sets of indices that are associated with different frequencies represented by the line.

20 Claims, 8 Drawing Sheets

SYSTEMS AND METHODS FOR GENERATING A LINE THAT REPRESENTS DIFFERENT FREQUENCIES BASED ON MULTI-DIMENSIONAL DATA ENCODING

BACKGROUND

A point cloud may include millions or billions of data points for generating a high-resolution representation of an object, environment, and/or dataset. Loading, processing, editing, rendering, and/or otherwise interacting with such point clouds may overwhelm the memory, processing, and/or other resources of a computer system. Consequently, the user experience may be compromised as the computer system may become slow to respond, unresponsive, or may even crash. The same issues may arise with extremely high-resolution two-dimensional ("2D") images and/or other multi-dimensional data formats that include a large number of data points with each data point being defined with multiple different values.

DETAILED DESCRIPTION OF PREFERRED EMBODIMENTS

The following detailed description refers to the accompanying drawings. The same reference numbers in different drawings may identify the same or similar elements.

Provided are systems and methods for performing lossless line fit data compression. The line fit data compression may create a highly compressed representation of a point cloud, image, video, and/or other multi-dimensional data (e.g., data defined across two or more dimensions or values) for quick and/or lossless access to the data. Specifically, the highly compressed representation may be used as a reference for identifying which parts of the multi-dimensional data to read and/or process in memory and which parts may be kept out of the memory.

In some embodiments, the line fit data compression may be performed by a multi-dimensional encoder ("MDE"). The MDE may flatten the multi-dimensional data (e.g., x, y, and z positional coordinates, red, green, and blue ("RGB") color values, and/or other multi-dimensional data values) into a flattened single-dimensional array, may convert the multi-dimensional values from an occurrence domain (e.g., Cartesian coordinates for positional data, RGB values for non-positional data, etc.) to a frequency domain, and/or may generate one or more lines to represent the multi-dimensional data values.

In some embodiments, the MDE may include a decoder for converting the one or more lines back to the exact values of the multi-dimensional data represented by those one or more lines. Specifically, each point along a generated line or specific frequency of the line may map back to one or more data points that have a set of positional coordinates, RGB values, and/or other multi-dimensional data represented by that point or specific frequency of the line. In some embodiments, the frequencies may correspond to indices that are assigned to the data points so that the mapping from the frequency domain to the occurrence domain may occur without data loss. In other words, the line fit data compression may be a lossless compression technique for multi-dimensional data.

Figure 1:
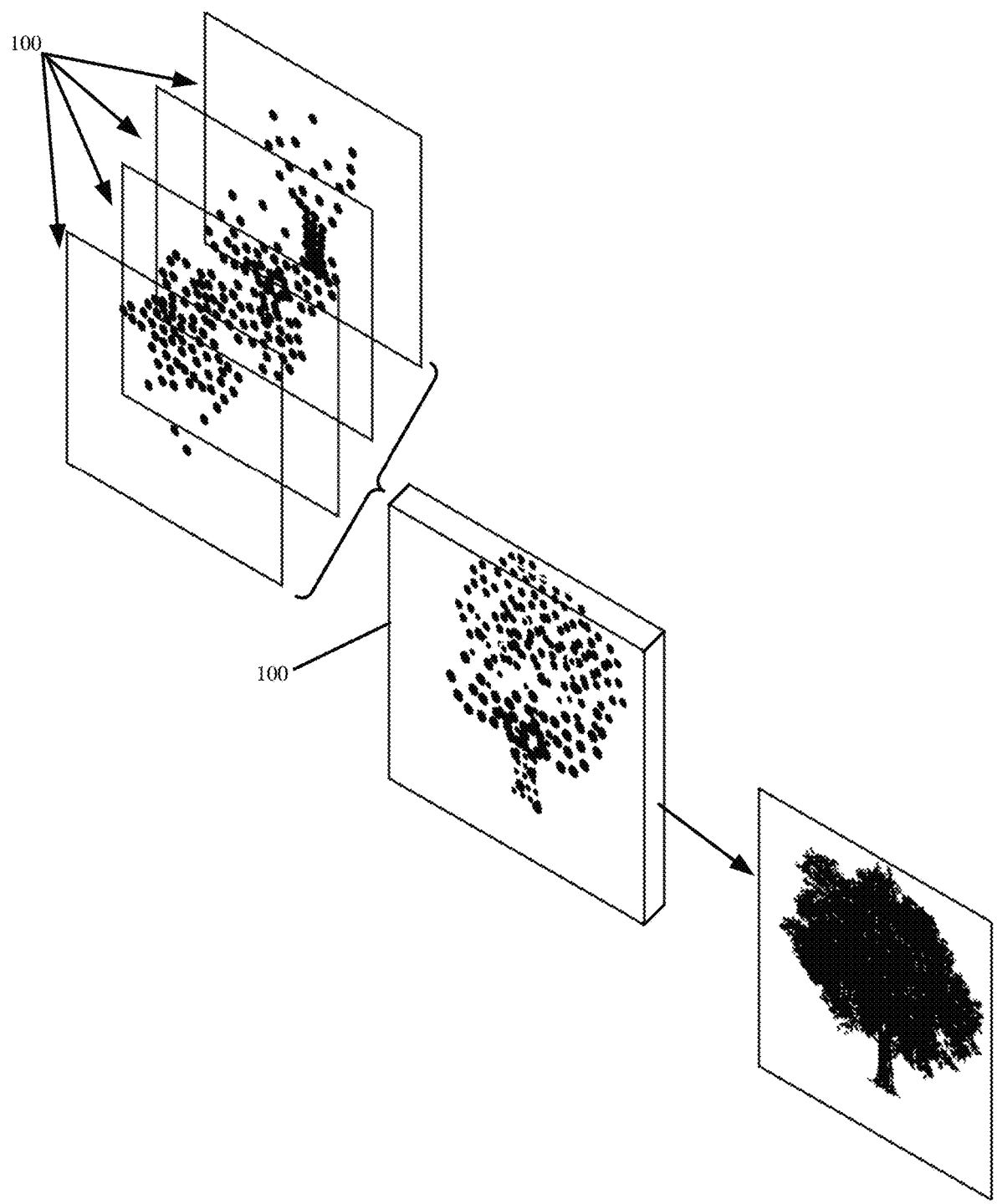
FIG. 1 illustrates a point cloud as an example of a multi-dimensional data format in accordance with some embodiments presented herein.

FIG. 1 illustrates point cloud 100 as an example of a multi-dimensional data format in accordance with some embodiments presented herein. Point cloud 100 may represent a three-dimensional ("3D") object or 3D environment using data points with different characteristics at different 3D positions. The point cloud data points may differ from pixels of a two-dimensional ("2D") image, because certain regions of point cloud 100 may have no data points, lower densities of data points, and/or higher densities of data points based on varying amounts of visual information that is detected or scanned at those regions. Additionally, the position of the point cloud data points may be defined in 3D space using x, y, and z coordinate values. In contrast, pixels of a 2D image are defined in 2D space and have a uniform density or fixed arrangement that is defined by the resolution of the 2D image. In other words, the point cloud data points may have a non-uniform placement or positioning, whereas the 2D image may have pixel data for each pixel of a defined resolution (e.g., 640×480, 800×600, etc.).

Each point cloud data point may be defined with a plurality of elements. The plurality of elements may include a first set of positional elements, and a second set of non-positional or descriptive elements.

The positional elements may include coordinates within 3D space. For instance, each point cloud data point may include x-coordinate, y-coordinate, and z-coordinate elements to capture the position of an imaged surface, feature, or article of the 3D object or the 3D environment in 3D space.

The non-positional elements may include information about the detected characteristics of the surface, feature, or article imaged at a corresponding position in 3D space. The characteristics may correspond to a detected color. The color may be represented using red, green, blue ("RGB"), and/or other values. In some embodiments, the characteristics may provide the chrominance, hardness, translucence, reflectivity, luminance, metallic characteristics, roughness, specular, diffuse, albedo, index of refraction ("IOR"), and/or other properties of the imaged surface, feature, or article.

In some embodiments, the characteristics may be related to properties of the device used to generate each of data points. For instance, the characteristics may include a Tesla strength value to quantify the strength of the magnetic field that was used in detecting and/or imaging the surface, feature, or article represented by a particular point cloud data point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding data point in 3D space.

Each point cloud data point may include an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, red, green, blue, chrominance, hardness, translucence, reflectivity, luminance, metallic characteristics, roughness, specular, diffuse, albedo, IOR, tesla, and/or other values.

Point cloud 100 and the individual data points of point cloud 100 may be generated by a 3D or depth-sensing camera, Light Detection and Ranging ("LiDAR") sensor, Magnetic Resonance Imaging ("MM") device, Positron Emission Tomography ("PET") scanning device, Computerized Tomography ("CT") scanning device, time-of-flight device, and/or other imaging equipment for 3D objects, volumetric objects, or 3D environments. Point cloud 100 may be generated from output of two or more devices. For instance, a first imaging device (e.g., a LiDAR sensor) may determine the position for each data point in 3D space, and a second imaging device (e.g., a high-resolution camera) may measure or capture the characteristics or other non-positional information for each data point. One or more photogrammetry techniques may be used to consolidate the data from the first imaging device and the second imaging device, and to create the point cloud 100.

2D images, animations, videos, and audio are other examples of multi-dimensional data that are defined by a set of data points with each data point having two or more elements with defined values. For instance, a 2D may have multi-dimensional positional elements (e.g., x-coordinate and y-coordinate values) as well as multi-dimensional non-positional elements (e.g., RGB color values). Similarly, audio may be defined across multiple dimensions based on the wavelength, amplitude (e.g., loudness), frequency (e.g., pitch), and/or time period.

Figure 2:
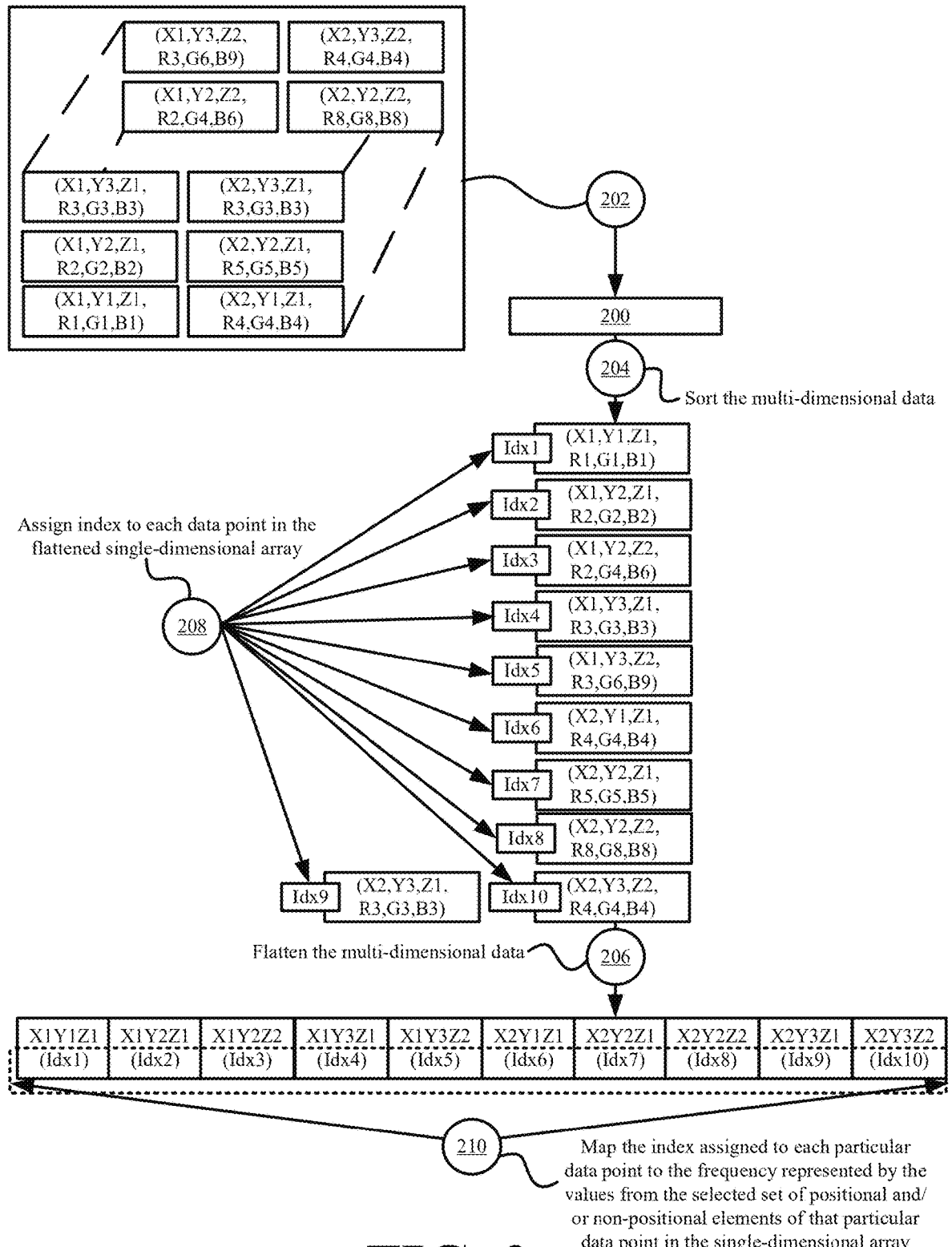
FIG. 2 illustrates an example of the frequency domain conversion performed for multi-dimensional data in accordance with some embodiments presented herein.

FIG. 2 illustrates an example of the frequency domain conversion performed by MDE 200 for multi-dimensional data in accordance with some embodiments presented herein. MDE 200 may receive (at 202) the multi-dimensional data.

As shown in FIG. 2, the multi-dimensional data may include the data points of a point cloud or other multi-dimensional data format. The data points may have multi-dimensional positional elements as well as various multi-dimensional non-positional elements. For instance, the positional elements of each data point may include x, y, and z coordinates that define the position of that data point in 3D space. The non-positional elements of each data point may include RGB color values, luminance values, reflectivity values, and/or other values that define the visual characteristics of that data point.

In some other embodiments, the multi-dimensional data may include pixels with 2D coordinates and RGB values for each pixel. MDE 200 may adapt to operate over any number of dimensions used in defining positional and/or non-positional elements of the multi-dimensional data.

MDE 200 may sort (at 204) the multi-dimensional data for a desired ordering. For instance, MDE 200 may sort (at 204) the point cloud data points so that data points in a common z-plane are positioned next to each other, or may sort (at 204) the point cloud data points in order from lowest x-coordinate to highest x-coordinate with each data point having the same x-coordinate being sorted from lowest y-coordinate to highest y-coordinate. The sorting (at 204) may be performed so that when the data points are compressed to and represented by a line, different continuous segments of that line may represent different continuous regions within the point cloud.

In some embodiments, MDE 200 may sort (at 204) the multi-dimensional data based on a first set of elements to create a first ordering, and may separately sort (at 204) the multi-dimensional data based on a second set of elements to create a second ordering. The sorting (at 204) may reveal the frequency with which certain values appear within the multi-dimensional data. For instance, no data points may have the same positional elements, but two or more data points may have the same RGB color values or other set of non-positional elements. Accordingly, the sorting (at 204) may be a preprocessing operation for converting the multi-dimensional data to the frequency domain.

In some embodiments, MDE 200 may perform an intelligent sorting of the data points. For instance, MDE 200 may inspect the point cloud to identify different sets of data points that correspond to different objects or features of the point cloud image or environment. In some embodiments, MDE 200 may perform image recognition, boundary detection, and/or use one or more artificial intelligence and/or machine learning ("AUML") techniques to differentiate between the different sets of data points that correspond to the different objects or features. MDE 200 may sort (at 204) or group together the set of data points that are associated with the same object or feature.

In some embodiments, MDE 200 may omit the sorting (at 204) operation, and may directly map the multi-dimensional data from occurrence domain to the frequency domain.

MDE 200 may flatten (at 206) the multi-dimensional data to a single-dimensional array. For instance, a 3×3 array with values ([0, 1, 2], [3, 4, 5], and [6,7,8]) may be flattened (at 206) into a 1×9 single-dimensional array of [1, 2, 3, 4, 5, 6, 7, 8, 9]. In some embodiments, the flattening (at 206) may be applied to any of the positional and/or non-positional elements of the multi-dimensional data when the multi-dimensional data is represented in a multi-dimensional matrix or array format. In some embodiments, flattening (at 206) the multi-dimensional data may include concatenating and/or otherwise merging a set of values from the sorted multi-dimensional data into a single value that is more easily mapped to a frequency. For instance, the position of a data point may be represented in a point cloud with three separate values (e.g., (X1, Y1, Z1)), and flattening (at 206) the multi-dimensional data may include representing the position of the data point with a single concatenated value (e.g., X1Y1Z1). The same flattening (at 206) may be applied to different subsets of non-positional elements (e.g., RGB color values). In some embodiments, flattening (at 206) the multi-dimensional data may include appending the values to one another, summing the values together with or without bit-shifting, and/or performing other mathematical operations to convert the multi-dimensional values as a single unique value.

The single-dimensional array may represent or correspond to the frequencies that are active in the frequency domain. Accordingly, the flattening (at 206) may be a transformation operation for mapping a selected set of positional and/or non-positional elements from the occurrence domain, that includes the actual multi-dimensional data values, to the frequency domain, that represents the number of instances a particular set of multi-dimensional data values appears within the dataset being compressed.

MDE 200 may assign (at 208) an index to each data point or at each data point element. In some embodiments, the index may be a sequential integer value that is added as a non-positional element to each data point in the sorted single-dimensional array. In some other embodiments, the index is the single value generated from a set of values from each data point. For instance, the index for a first data point may be a combination of the first data point's x, y, and z coordinates (e.g., X1Y1Z1), and the index for a second data point may be a combination of the second data point's x, y, and z coordinates (e.g., X1Y1Z2).

MDE 200 may map (at 210) the index assigned (at 208) to each particular data point or data point element to the frequency represented by the values from the selected set of positional and/or non-positional elements of that particular data point or data point element in the single-dimensional array. The mapping (at 210) may include associating or otherwise linking the data point or data point element indices to frequencies generated by those data points or data point elements in the frequency domain.

Figure 3:
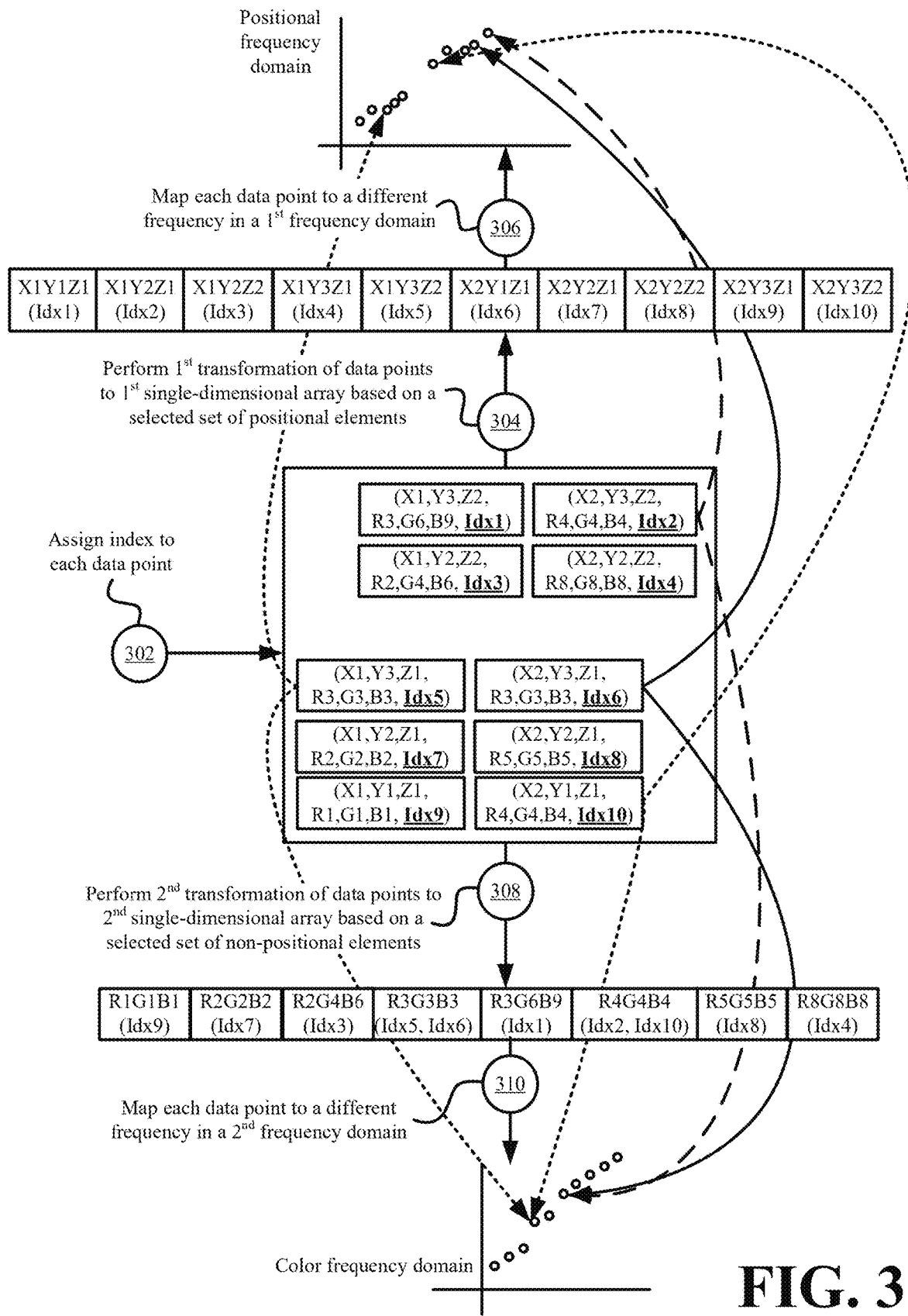
FIG. 3 illustrates examples of different transformations that may be made to flatten the multi-dimensional data to single-dimensional array for index assignment and/or mapping to the frequency domain in accordance with some embodiments presented herein.

FIG. 3 illustrates examples of different transformations that may be made to flatten the multi-dimensional data to single-dimensional array for index assignment and/or mapping to the frequency domain in accordance with some embodiments presented herein. The multi-dimensional data may include point cloud data points that are distributed in a 3D space with each data point having at least RGB color values as non-positional elements.

As shown in FIG. 3, MDE 200 may assign (at 302) a unique index to each data point or to each data point element. For instance, MDE 200 select each data point, may assign (at 302) a new index whenever a new value is detected for any element of the data points, and may store the mapping between the indices and the element values. Alternative, MDE 200 may select each data point by running through all possible positional element value combinations, and may assign (at 302) a different index whenever a data point is encountered at one of the positional element value combinations. In some embodiments, MDE 200 may assign (at 302) the unique index as a new non-positional element of each data point.

MDE 200 may perform (at 304) a first transformation that flattens the data points to a first single-dimensional array based on their positional values. Performing (at 304) the first transformation may include associating the index of each data point to the element within the first single-dimensional array that represents the positional values of that data point.

Accordingly, each element of the first single-dimensional array may be a different single value that represents some merging or converting of two or more positional values (e.g., x and y coordinates, x and z coordinates, y and z coordinates, and/or x, y, and z coordinates). The number of indices associated with each element of the single-dimensional array determines the frequency with which the corresponding single value, that represents a combination of data point positional values, occurs in the multi-dimensional data.

MDE 200 may map (at 306) each indexed data point or each indexed data point element to a different frequency in a first positional frequency domain.

MDE 200 may perform (at 308) a second transformation that flattens the data points to a second single-dimensional array based on their RGB color values or non-positional elements. In some embodiments, performing (at 308) the second transformation may include associating the index representing a unique value for any of the red, green, or blue elements to an element within the second single-dimensional array that represents that unique value. In some embodiments, performing (at 308) the second transformation may include associating the index of each data point to the element within the second single-dimensional array that represents the RGB color values of that data point. Since two or more data points may have the same RGB color values, the second transformation may result in indices of the two or more data points being associated with the same element of the second single-dimensional array.

MDE 200 may map (at 310) the data points to different frequencies in a second RGB positional frequency domain based on their RGB color values and/or the number of indices associated with each element of the second single-dimensional array. Specifically, each frequency in the second RGB positional frequency domain may represent a different RGB color combination or a different RGB color component that is represented by a different element of the second single-dimensional array, and the frequency of a RGB color combination or RGB color component shared by two or more data points will be greater than the frequency of another RGB color combination or RGB color component defined for only a single data point in the multi-dimensional data.

Figure 4:
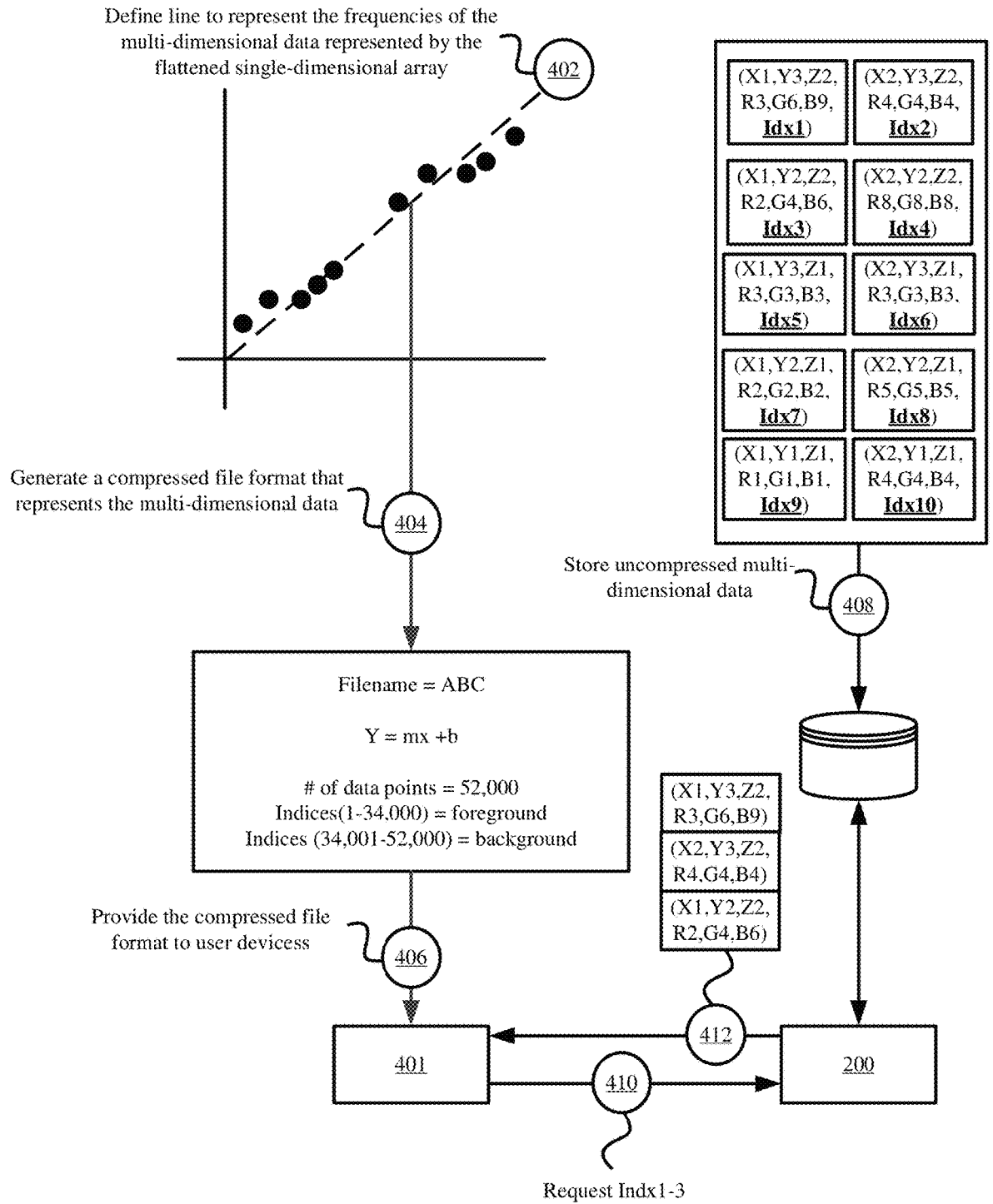
FIG. 4 illustrates an example of the line fit compression of the flattened single-dimensional array in accordance with some embodiments presented herein.

FIG. 4 illustrates an example of the line fit compression of the flattened single-dimensional array performed by MDE 200 in accordance with some embodiments presented herein. MDE 200 may define (at 402) a line to represent the frequencies of the multi-dimensional data represented by the flattened single-dimensional array.

In some embodiments, the indices associated with the single-dimensional array may have a monotonically increasing pattern. Accordingly, MDE 200 may define (at 402) the line with a y-intercept ("b") that corresponds to the first element or first index within the flattened single-dimensional array, a slope ("m") based on the rate at which the indices increase, and a number of indices or data points that are indexed ("x"). The line may be represented by the formula $y=mx+b$.

MDE 200 may generate (at 404) a compressed file format that represents the multi-dimensional data. The compressed file format may include the name, link, URL, directory path, and/or other access identifier for the original file with the uncompressed multi-dimensional data, the defined line, the number of indexed data points, and/or a mapping of index ranges to regions of the point cloud or image defined by the multi-dimensional data. In some embodiments, the mapping may identify that indices 1-34000 correspond to the data points in the foreground, and that indices 34001-52000 correspond to the data points in the background. In some other embodiments, the mapping may identify a first range of indices that correspond to a first object or feature in the image, a second range of indices that correspond to a second object or feature in the image, and a third range of indices that correspond to the image background. In still some other embodiments, the mapping identify a number of data points that are defined with particular positional or non-positional values.

MDE 200 may provide (at 406) the compressed file format to one or more devices 401 or machines that access the multi-dimensional data, and may store (at 408) the original uncompressed multi-dimensional data separately in a database and/or storage. One or more devices 401 may issue (at 410) requests for different indices when processing, rendering, and/or otherwise accessing the multi-dimensional data via the compressed file format, and MDE 200 may return (at 412) the uncompressed multi-dimensional data for the data points referenced by the requested indices. In this manner, one or more devices 401 do not unnecessarily load in all the multi-dimensional data when accessing the point cloud, image, or other file containing the multi-dimensional data. Instead, MDE 200 may distribute and/or stream different parts of the multi-dimensional data that are being accessed by one or more devices 401 in an on-demand manner. This substantially reduces the memory overhead required of one or more devices 401 when working with large files, and improves overall performance as less data has to be managed, loaded, and/or otherwise processed at any given time.

Figure 5:
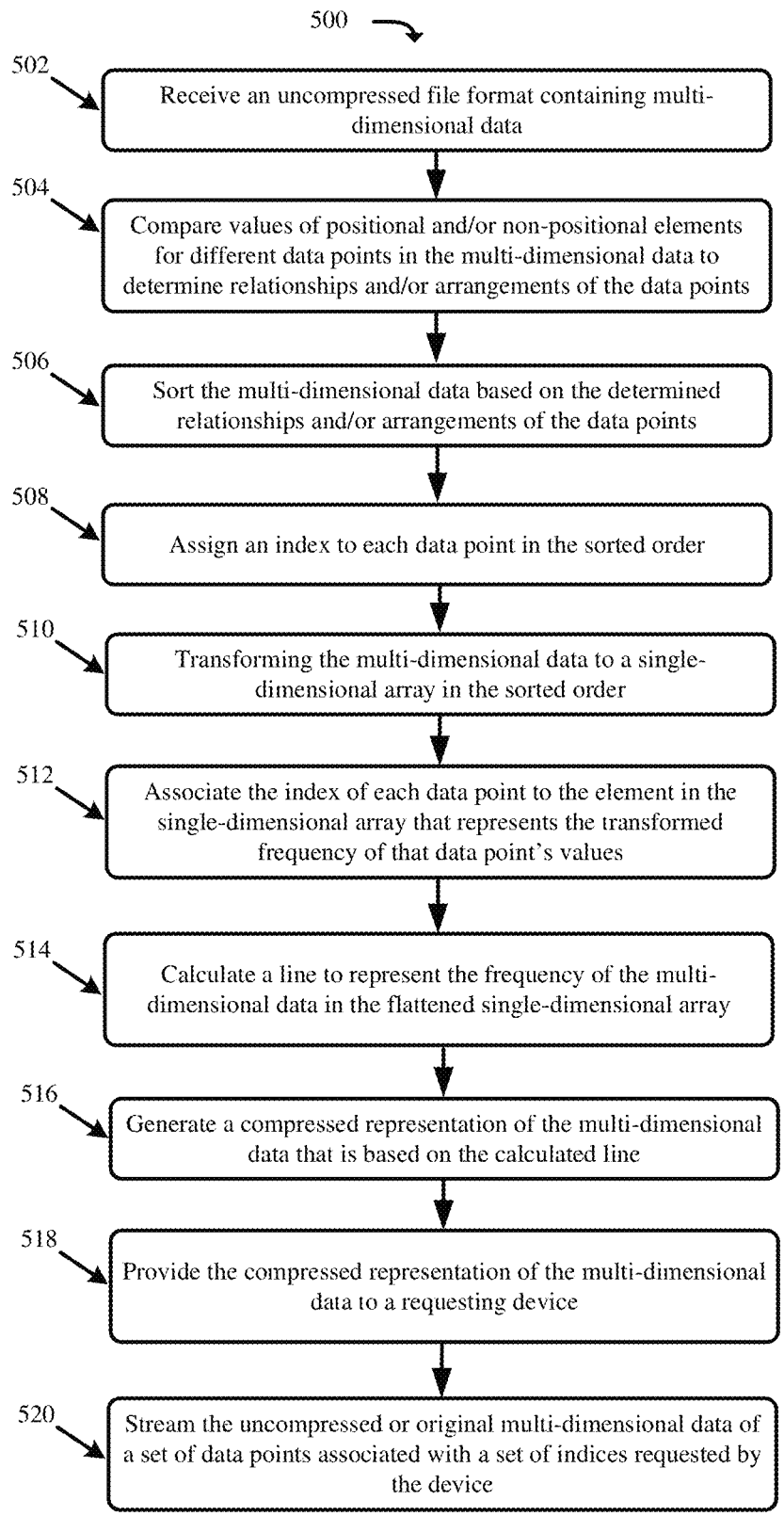
FIG. 5 presents a process for performing the lossless line fit data compression of multi-dimensional data in accordance with some embodiments presented herein.

FIG. 5 presents a process 500 for performing the lossless line fit data compression of multi-dimensional data in accordance with some embodiments presented herein. Process 500 may be implemented by MDE 200. Specifically, MDE 200 may include a device or may be integrated as part of a system that includes one or more hardware processors used in implementing process 500.

Process 500 may include receiving (at 502) an uncompressed file format containing multi-dimensional data. In some embodiments, the multi-dimensional data may define the positioning of data points within a 2D, 3D, or other multi-dimensional space. In some embodiments, the multi-dimensional data may define the non-positional elements of the data points. For instance, the non-positional element may correspond to color, light, material properties, other visual characteristics, and/or other attributes of the data points that are unrelated to the data point positioning.

Process 500 may include comparing (at 504) values of positional and/or non-positional elements for different data points in the multi-dimensional data to determine relationships and/or arrangements of the data points. In some embodiments, the comparison (at 504) may be combined with image analysis, pattern recognition, and/or other AI/ML techniques in order to differentiate between groups of the multi-dimensional data that represent different features, objects, or regions of interest within the image or scene created by the multi-dimensional data.

Process 500 may include sorting (at 506) the multi-dimensional data based on the determined relationships and/or arrangements of the data points. The sorting (at 506) may be performed so that related data points (e.g., data points of the same object, region, having the same positional or non-positional values, etc.) may receive consecutive or related indices.

In some embodiments, MDE 200 may produce two or more different orderings for the multi-dimensional data. For instance, MDE 200 may produce a first ordering by sorting (at 506) the multi-dimensional data based on increasing positional values, and may produce a second ordering by sorting (at 506) the multi-dimensional data based on increasing non-positional values. In some embodiments, the sorting (at 506) may include grouping the data points for a common feature, object, or region of interest.

Process 500 may include assigning (at 508) an index to each data point or unique data point element in the sorted order. In some embodiments, the index may include a consecutive or sequential value that is added as a non-positional element or metadata of the data point. In some other embodiments, the index may be derived from a combination of values or a unique set of values from the positional and/or non-positional elements of the data point.

Process 500 may include transforming (at 510) the multi-dimensional data to a single-dimensional array in the sorted order. The transformation (at 510) may include mapping the multi-dimensional data to the frequency domain according to a frequency with which values derived from two or more positional or non-positional elements appear in the multi-dimensional data.

Process 500 may include associating (at 512) the index of each data point or each data point element to the element in the single-dimensional array that represents the transformed frequency of that data point's values. In some embodiments, each entry or each frequency may be associated with the index of zero or one data points when the frequencies represent unique combinations or unique data point element values that are not shared by any two data points of the multi-dimensional data. In some embodiments, the index of two or more data points or data point elements may be associated with the same entry in the single-dimensional array when the two or more data points or data point elements are defined with the same combination of data point values or the same individual values (e.g., the same color values, the same chrominance and luminance values, the same reflectivity, translucence, and material property values, etc.).

Process 500 may include calculating (at 514) a line to represent the frequency of the multi-dimensional data in the flattened single-dimensional array. The slope of line may be determined from the number of indices associated with each element of the single-dimensional array. The line intercept may be set to a first index of the single-dimensional array.

In some embodiments, MDE 200 may calculate (at 514) multiple lines to represent the multi-dimensional data. For instance, a first line may be defined based on the transformation of the multi-dimensional data positional elements to a first frequency domain, and a second line may be defined based on the transformation of the multi-dimensional data non-positional elements (e.g., RGB color values) to a second frequency domain. Accordingly, the first line may provide a first compressed encoding that represents the positioning of the data points in the first frequency domain, and the second line may provide a second compressed encoding that represents the color values and/or other non-positional elements of the data points in the second frequency domain. In some embodiments, the first line may be defined based on the transformation of a first set of the non-positional elements to a first frequency domain, and the second line may be defined based on the transformation of a second set of non-positional elements or some unique set of positional elements and non-positional elements to a second frequency domain.

Process 500 may include generating (at 516) a compressed representation of the multi-dimensional data that is based on the calculated line. The compressed representation may include the line as defined by a derivation of the $y=mx+b$ formula, the number of indices corresponding to the number of data points from the multi-dimensional data that are in the frequency domain represented by the line, and/or descriptive information about different features, objects, or regions that may be represented by different sets of indices. The descriptive information may provide a mapping between what the indices represent in the compressed representation should the user wish to access specific parts, features, objects, or regions from the uncompressed multi-dimensional data.

Process 500 may include providing (at 518) the compressed representation of the multi-dimensional data in response to an access request from a device that is directed to the multi-dimensional data. In other words, rather than return the file containing all of the uncompressed multi-dimensional data, MDE 200 may distribute the compressed representation defined by the line, number of indices, and/or descriptive information when the multi-dimensional data file and/or format is first requested or accessed by the device.

The device may then issue requests for desired parts, objects, features, or of the multi-dimensional data regions (e.g., foreground versus background or data points within some coordinate range) to MDE 200. For instance, the device may generate a low resolution image from a point cloud by requesting every other data point or index from the compressed representation, or may generate an image for a first region of the point cloud by requesting a specific set of data points corresponding to a specific set of indices from the compressed representation. The specific set of data points may correspond to the point cloud data points that are within a render frustum or field-of-view.

Process 500 may include streaming (at 520) or distributing the uncompressed or original multi-dimensional data of a set of data points associated with a set of indices requested by the device. Over time, the device may request all the multi-dimensional data from MDE 200. By streaming (at 520) in the multi-dimensional data in parts or at different times, the device may avoid loading in all the multi-dimensional data at one time as may occur when the multi-dimensional data is contained in a single file that is opened by the device.

Figure 6:
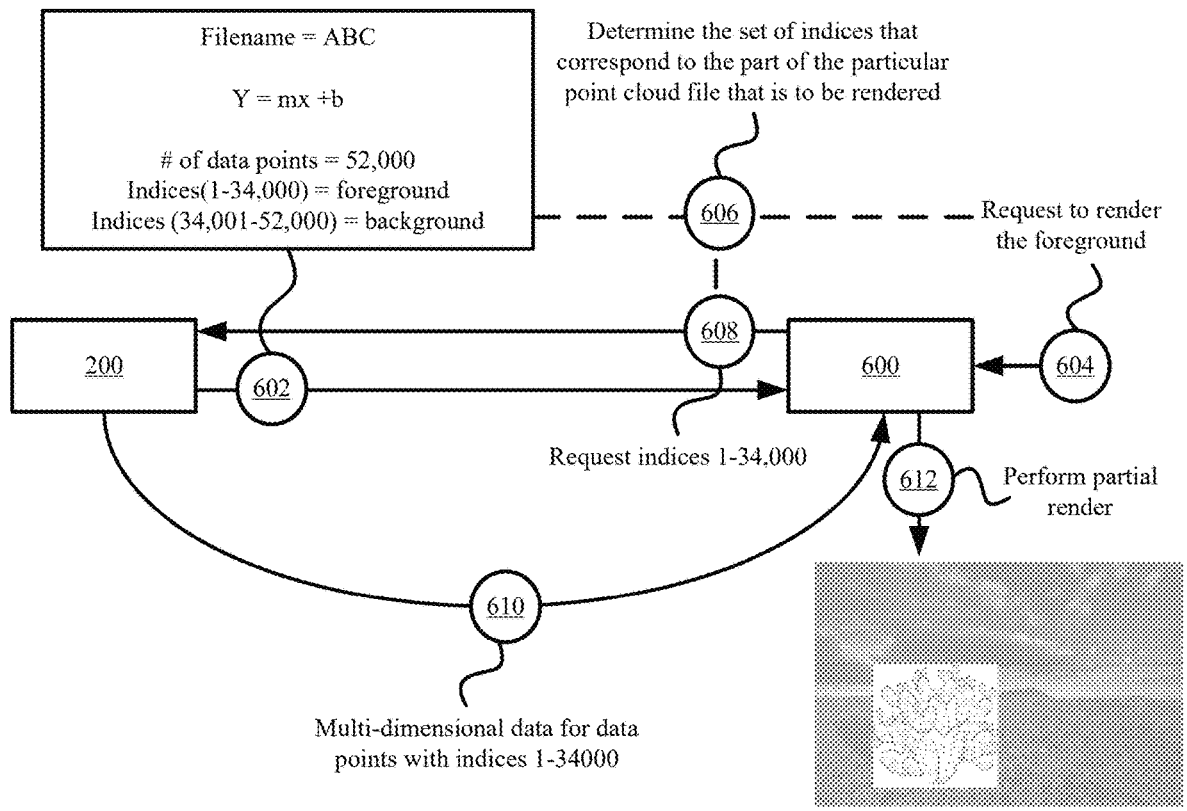
FIG. 6 illustrates an example of reading in the multi-dimensional data from the line-based compressed representation or encoding in accordance with some embodiments presented herein.

FIG. 6 illustrates an example of reading in the multi-dimensional data from the line-based compressed representation or encoding in accordance with some embodiments presented herein. As shown in FIG. 6, device 600 may initiate a request to access a particular point cloud file. MDE 200 may provide (at 602) the line-based compressed representation to device 600.

The line-based compressed representation may contain references to all the multi-dimensional data of the particular point cloud file, and may therefore represent the particular point cloud file in a fraction of the size of the particular point cloud file. For instance, the particular point cloud file may be gigabytes in size, whereas the line-based compressed representation may be a few kilobytes or megabytes in size. Accordingly, MDE 200 may distribute (at 602) the line-based compressed representation in a fraction of the time to device 600 than it takes to distribute the particular point cloud file.

In some embodiments, MDE 200 may run on device 600 or as part of a point cloud system that is run on device 600. In some such embodiments, the performance gains may still be realized since device 600 initially loads only the line-based compressed representation to begin operations rather than the entirety of the multi-dimensional data when loading in the particular point cloud file directly.

Device 600 may receive a request (at 604) to render part of the particular point cloud file. The request may be issued in response to user input or in response to an application that accesses the particular point cloud file.

Device 600 may inspect (at 606) the line-based compressed representation to determine the set of indices that correspond to the part of the particular point cloud file that is to be rendered, and may issue (at 608) a request for those indices to MDE 200. In response to the request, MDE 200 may identify the point cloud data points that are assigned the requested indices, and may distribute (at 610) the multi-dimensional data for the requested data points to device 600. Device 600 may then generate (at 612) an initial image by rendering the returned multi-dimensional data.

As the render position changes or as other parts of the point cloud are accessed on device 600, device 600 may submit additional requests to MDE 200, and MDE 200 may stream or load into memory of device 600 the multi-dimensional data falling within the updated render position or the other access parts of the point cloud. For instance, device 600 may initially request, receive, load, and render the foreground data points, and may subsequently request, receive, load, and render the background data points. By referencing the line-based compressed representation instead of loading in and searching through the multi-dimensional data, device 600 may become more responsive and may operate on or process files containing massive amounts of multi-dimensional data with minimal memory and/or other resource usage.

In some embodiments, the indexing of the data points and/or transformation of the data points to the frequency domain may produce spikes and/or other variances that prevent the representation of the data points with a single line. In some such embodiments, MDE 200 may generate different lines to align with the distribution of different sets of the data points in the frequency domain.

Figure 7:
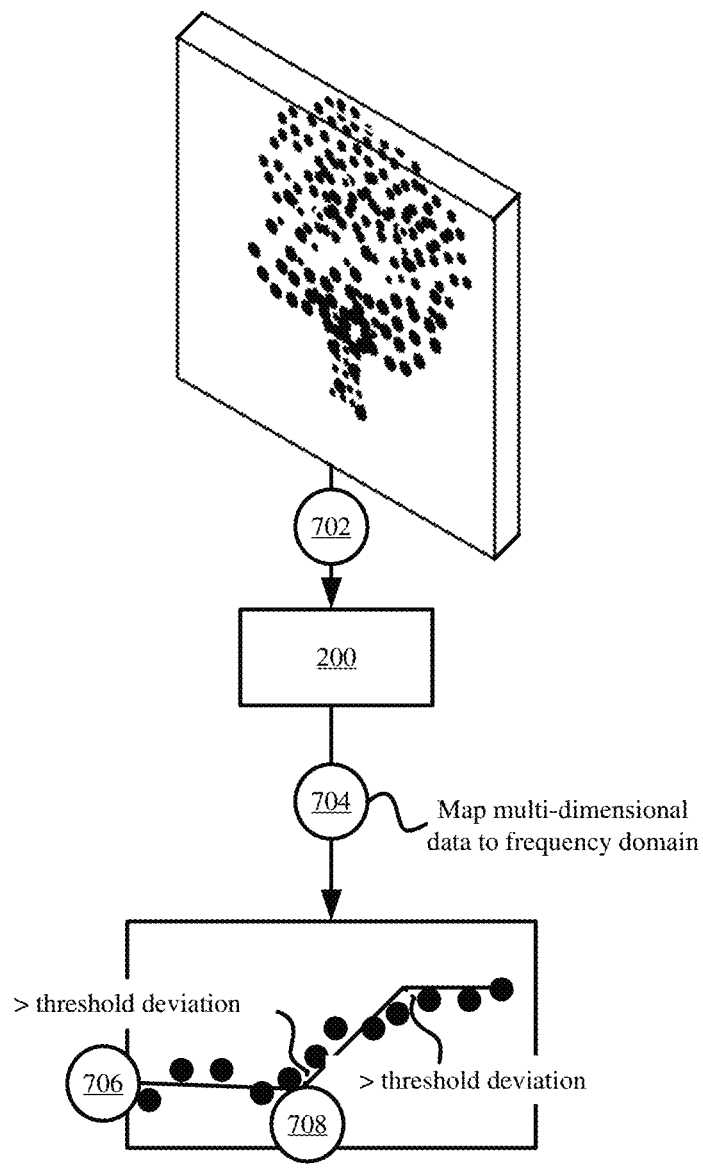
FIG. 7 illustrates an example of compressing multi-dimensional data with multiple lines in accordance with some embodiments presented herein.

FIG. 7 illustrates an example of compressing multi-dimensional data with multiple lines in accordance with some embodiments presented herein. MDE 200 may receive (at 702) a point cloud or a 2D image.

MDE 200 may map (at 704) the data points to the frequency domain based on their respective color values. Since two or more data points may have the same exact set of color values, the mapping may produce spikes and/or other variations that prevent the frequency domain distribution from being represented with a single line.

In some embodiments, MDE 200 may generate (at 706) a single best-fit line for the frequency domain distribution, and may compare the variance between the best-fit line and the distribution. In response to one or more of the mapped frequencies being a threshold distance from the best-fit line, MDE 200 may shorten the line to extend up to the detected variance.

MDE 200 may generate (at 708) a second best-fit line that begins at the detect variance and continues through the remainder of the frequency domain. Once again, if one or more of the mapped frequency are more than a threshold distance, MDE 200 may shorten the second best-fit line to stop at the next detected point in the frequency domain that deviates from the slope and/or trajectory of the second best-fit line by more than the threshold distance.

Figure 8:
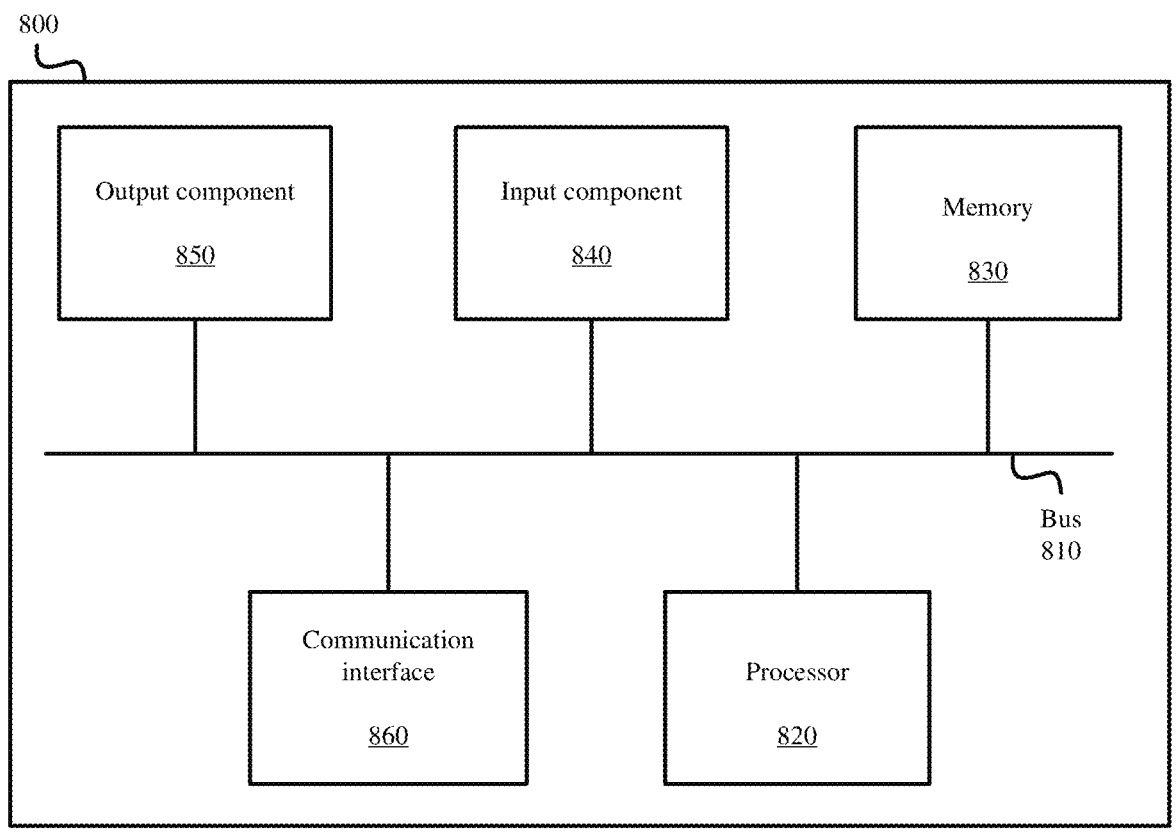
FIG. 8 illustrates example components of one or more devices, according to one or more embodiments described herein.

FIG. 8 is a diagram of example components of device 800. Device 800 may be used to implement one or more of the devices or systems described above (e.g., MDE 200, devices 401 and 600, point cloud system, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving, at a multi-dimensional encoder (MDE), a file comprising a plurality of data points, wherein each data point of the plurality of data points is defined with uncompressed multi-dimensional data comprising a plurality of elements;
   assigning, by execution of the MDE, an index to each data point of the plurality of data points;

mapping, by execution of the MDE, the plurality of data points to a frequency domain based on different frequencies with which different values occur in two or more elements of the plurality of elements;

generating, by execution of the MDE, a line that represents the different frequencies with which the different values occur in the two or more elements; and providing a compressed file format from the MDE to a requesting device in response to a request from the requesting device to access the file, wherein the compressed file format comprises the line and different sets of indices that are associated with the different frequencies represented by the line.

2. The method of claim 1, wherein mapping the plurality of data points comprises:

determining a particular frequency of the different frequencies in the frequency domain based a number of data points in a set of the plurality of data points that have common values defined for the two or more elements; and assigning the index from each data point of the set of data points to the particular frequency.

3. The method of claim 1 further comprising:

associating the index of each particular data point to a particular frequency of the different frequencies represented by the line based on values defined for the two or more elements of the particular data point mapping to the particular frequency.

4. The method of claim 1, wherein mapping the plurality of data points comprises:

flattening the uncompressed multi-dimensional data represented by the two or more elements of the plurality of data points to a single dimension, wherein the single dimension represents values for the two or more elements as a single value.

5. The method of claim 1 further comprising:

receiving a second request to access a particular set of indices in response to providing the compressed file format; and distributing the uncompressed multi-dimensional data that is defined for the plurality of elements of a set of data points assigned with an index from the particular set of indices.

6. The method of claim 1, wherein generating the line comprises:

defining a slope of the line based on the different frequencies of the two or more elements from the plurality of data points being defined with the different values.

7. The method of claim 1, wherein mapping the plurality of data points comprises:

determining a particular frequency in the frequency domain based on a number of data points from the plurality of data points that have two or more positional coordinates in common, wherein the plurality of elements comprises the two or more positional coordinates and two or more color values.

8. The method of claim 7 further comprising:

receiving a second request for a set of the plurality of data points in a particular region of the frequency domain after providing the compressed file format;

determining a set of the different frequencies within the frequency domain that are determined from the two or more positional coordinates in the particular region;

obtaining a set of indices that are associated with the set of the different frequencies; and providing the uncompressed multi-dimensional data for a set of the plurality of data points that are assigned the set of indices, wherein the uncompressed multi-dimensional data for the set of data points comprises the two or more positional coordinates and the two or more color values defined for each data point in the set of data points.

9. The method of claim 1, wherein mapping the plurality of data points comprises:

determining a particular frequency in the frequency domain based on a number of data points from the plurality of data points that have two or more color values in common, wherein the plurality of elements are defined with two or more positional coordinates and the two or more color values.

10. The method of claim 9 further comprising:

receiving a second request for a set of the plurality of data points having a set of color values after providing the compressed file format;

determining a set of the different frequencies within the frequency domain that are determined from the set of color values;

obtaining a set of indices that are associated with the set of the different frequencies; and providing the uncompressed multi-dimensional data for a set of the plurality of data points that are assigned the set of indices, wherein the uncompressed multi-dimensional data for the set of data points comprises the two or more positional coordinates and the two or more color values defined for each data point in the set of data points.

11. The method of claim 1, wherein mapping the plurality of data points comprises:

performing a first transformation of the plurality of data points to a first frequency domain based on a first plurality of frequencies representing different numbers of the plurality of data points being defined at different positions in a multi-dimensional space; and performing a second transformation of the plurality of data points to a second frequency domain based on a second plurality of frequencies representing different numbers of the plurality of data points being defined with different color combinations.

12. The method of claim 11, wherein generating the line comprises:

generating a first line to represent the first plurality of frequencies in the first frequency domain; and generating a second line to represent the second plurality of frequencies in the second frequency domain.

13. The method of claim 11 further comprising:

receiving a second request for data points in a particular region of a multi-dimensional space; and determining a first set of the plurality of data points within the particular region of the multi-dimensional space based on a set of the first plurality of frequencies in the first frequency domain representing the particular region.

14. The method of claim 13 further comprising:

receiving a third request for data points with a particular range of color values; and determining a second set of the plurality of data points having the particular range of color values based on a set of the second plurality of frequencies in the second frequency domain representing the particular range of color values.

15. A multi-dimensional encoder (MDE) comprising:

one or more hardware processors configured to:

receive a file comprising a plurality of data points, wherein each data point of the plurality of data points is defined with uncompressed multi-dimensional data comprising a plurality of elements;

assign an index to each data point of the plurality of data points;

map the plurality of data points to a frequency domain based on different frequencies with which different values occur in two or more elements of the plurality of elements;

generate a line that represents the different frequencies with which the different values occur in the two or more elements; and provide a compressed file format to a requesting device in response to a request from the requesting device to access the file, wherein the compressed file format comprises the line and different sets of indices that are associated with the different frequencies represented by the line.

16. The MDE of claim 15, wherein mapping the plurality of data points comprises:

determining a particular frequency of the different frequencies in the frequency domain based a number of data points in a set of the plurality of data points that have common values defined for the two or more elements; and assigning the index from each data point of the set of data points to the particular frequency.

17. The MDE of claim 15, wherein the one or more hardware processors are further configured to:

associate the index of each particular data point to a particular frequency of the different frequencies represented by the line based on values defined for the two or more elements of the particular data point mapping to the particular frequency.

18. The MDE of claim 15, wherein mapping the plurality of data points comprises:

flattening the uncompressed multi-dimensional data represented by the two or more elements of the plurality of data points to a single dimension, wherein the single dimension represents values for the two or more elements as a single value.

19. The MDE of claim 15, wherein the one or more hardware processors are further configured to:

receive a second request to access a particular set of indices in response to providing the compressed file format; and distribute the uncompressed multi-dimensional data that is defined for the plurality of elements of a set of data points assigned with an index from the particular set of indices.

20. A non-transitory computer-readable medium storing a plurality of processor-executable instructions that, when executed by one or more processors, cause a computing system to perform operations comprising:

receive a file comprising a plurality of data points, wherein each data point of the plurality of data points is defined with uncompressed multi-dimensional data comprising a plurality of elements;

assign an index to each data point of the plurality of data points;

map the plurality of data points to a frequency domain based on different frequencies with which different values occur in two or more elements of the plurality of elements;

generate a line that represents the different frequencies with which the different values occur in the two or more elements; and provide a compressed file format to a requesting device in response to a request from the requesting device to access the file, wherein the compressed file format comprises the line and different sets of indices that are associated with the different frequencies represented by the line.

* * * * *